United States Patent
Ruokonen et al.

(10) Patent No.: US 11,983,505 B2
(45) Date of Patent: May 14, 2024

(54) METHOD AND SYSTEM FOR TRANSLATING SOURCE TEXT OF FIRST LANGUAGE TO SECOND LANGUAGE

(71) Applicant: Transfluent Oy, Helsinki (FI)

(72) Inventors: Anssi Ruokonen, Vantaa (FI); Tomi Heiskanen, Säynätsalo (FI)

(73) Assignee: Transfluent Oy, Helsinki (FI)

( * ) Notice: Subject to any disclaimer, the term of this patent is extended or adjusted under 35 U.S.C. 154(b) by 315 days.

(21) Appl. No.: 17/506,128

(22) Filed: Oct. 20, 2021

(65) Prior Publication Data

US 2023/0120230 A1    Apr. 20, 2023

(51) Int. Cl.
*G06F 40/47* (2020.01)
*G06F 16/383* (2019.01)
*G06F 40/51* (2020.01)

(52) U.S. Cl.
CPC .......... *G06F 40/47* (2020.01); *G06F 16/383* (2019.01); *G06F 40/51* (2020.01)

(58) Field of Classification Search
CPC ......... G06F 40/47; G06F 16/383; G06F 40/51
See application file for complete search history.

(56) References Cited

U.S. PATENT DOCUMENTS

| | | | | |
|---|---|---|---|---|
| 6,233,546 B1 * | 5/2001 | Datig | ................... | G06F 40/211 |
| | | | | 704/7 |
| 11,449,686 B1 * | 9/2022 | Panchal | ................. | G06F 40/51 |
| 2008/0262828 A1 * | 10/2008 | Och | ........................ | G06F 40/47 |
| | | | | 704/3 |
| 2014/0303960 A1 | 10/2014 | Orsini et al. | | |
| 2016/0364384 A1 * | 12/2016 | Nakagiri | ................. | G06F 40/42 |
| 2017/0124071 A1 * | 5/2017 | Huang | .................... | G06F 40/51 |

(Continued)

FOREIGN PATENT DOCUMENTS

| | | | | |
|---|---|---|---|---|
| EP | 2317447 A1 * | 5/2011 | ......... | G06F 16/3337 |
| EP | 2317447 A1 | 5/2011 | | |
| JP | 6518981 B1 * | 5/2019 | | |

OTHER PUBLICATIONS

EP2317447A1-translation (Year: 2011).*

(Continued)

*Primary Examiner* — Bhavesh M Mehta
*Assistant Examiner* — Darioush Agahi
(74) *Attorney, Agent, or Firm* — Ziegler IP Law Group

(57) ABSTRACT

A method for translating a source text of a first language to a second language. The method includes receiving a translation request including the source text in the first language; selecting, from the source text, at least a first segment, associating at least one first metadata parameter with the first segment; providing the first segment to a first translation memory for determining a first set of translation proposals; determining a first quality score for each translation proposal; and comparing the first quality score of each translation proposal with a first predetermined acceptance threshold, and wherein based on the comparison, when a first quality score of at least one translation proposal is greater than the first predetermined acceptance threshold, the method comprises selecting a given translation proposal and providing the given translation proposal as an accepted translation of the first segment and as at least a part of an accepted translation of the source text.

16 Claims, 7 Drawing Sheets

(56) References Cited

U.S. PATENT DOCUMENTS

2021/0326537 A1* 10/2021 Liu .................. G06F 40/47
2022/0043987 A1* 2/2022 Wang ................ G06F 40/58

OTHER PUBLICATIONS

JP6518981B1-translation (Year: 2019).*

European Patent Office, Notification of Transmittal of the International Search Report and the Written Opinion of the International Searching Authority, or the Declaration, mailed Dec. 5, 2022, 14 Pages.

Harastani Rima et al, Ranking Translation Candidates Acquired from Comparable Corpora, International Joint Conference on Natural Language Processing, Oct. 1, 2013 (Oct. 1, 2013), pp. 401-409, XP093000940, Retrieved from the Internet: URL:https://aclanthology.org/I13-1046.pdf[retrieved on Nov. 22, 2022] abstract, "4 Sentences Alignment for Translation" "4.1 Reranking translation pairs".

* cited by examiner

METHOD AND SYSTEM FOR TRANSLATING SOURCE TEXT OF FIRST LANGUAGE TO SECOND LANGUAGE

TECHNICAL FIELD

The present disclosure relates generally to automated translation techniques and more specifically, to a method and system for translating a source text of a first language to a second language.

BACKGROUND

In recent times, the usage of translation memory systems to perform translations of text from one language to another, such as on Internet, has increased rapidly. The translation memories have a wide and highly practical implementation in various industries, especially in industries involved with inter-country or inter-continent interactions such as, but not limited to, multi-national corporations, regional organizations and so forth. Typically, the translation memories are configured for matching only with either an exact match for autonomous process or based on an edit-distance technique with the translator workflow.

Generally, different sets of words may comprise various misspellings, synonyms, or even a different word order that might result in an absent or partial match during translation. Moreover, each content creator has their own preferences and writing styles, that causes the translation memory matches to be lower or non-existing. However, traditional translation memories are unable to accurately consider the variations caused by at least one of misspellings, changed word orders, different synonyms, writing styles, words having similar translations and so forth. Moreover, since the context of the text to be translated is unknown, traditional translation memories may sometimes provide senseless translations due to the inherent context not being considered during translation.

Further, some translation services combine translation memory and machine translations, and in particular, example based machine translation (or EBMT) to provide the required translations, however, such services are unable to provide accurate and/or reliable translations. Furthermore, some translation services are configured to store source language sentences and target language sentences in the translation memory regardless of whether the sentences are matched to corresponding sentences in the other language and thus may provide accuracy problems during further translation.

Some solutions have been developed in order to solve the aforesaid problems. Typically, such conventional solutions for providing translations are configured to analyse documents on a word-by-word basis, and as such treats each translation request for the source text (or new document) as a novel request. These solutions suffer from reduced efficiency and do not consider and/or account for the redundancies found in the provided source text or document, and thereby are unable to employ the previous translations performed by the system to provide more accurate and faster translations.

Therefore, in light of the foregoing discussion, there exists a need to overcome the aforementioned drawbacks associated with techniques for translating the source text. In particular, there is a need to provide a centralized translation memory, wherein prior translations may be utilized to translate the incoming source texts and documents at least partially to be translated. Further, there is a need to involve the translation customer in an iterative process, with intermediate approvals of translation work being obtained as a translation task progresses.

SUMMARY

An object of the present disclosure is to provide a method for translating a source text of a first language to a second language. Another object of the present disclosure is to provide a system for translating the source text of the first language to the second language. Still, another object of the present disclosure is to provide a solution that overcomes at least partially the problems encountered in the prior art.

In an aspect, an embodiment of the present disclosure provides a method for translating a source text of a first language to a second language, the method comprising:
 (i) receiving a translation request, wherein the translation request comprises the source text in the first language;
 (ii) selecting, from the source text, at least a first segment;
 (iii) associating at least one first metadata parameter with the first segment;
 (iv) providing the first segment to a first translation memory for determining a first set of translation proposals corresponding to the first segment, wherein the first set of translation proposals are in the second language;
 (v) obtaining the first set of translation proposals from the first translation memory, wherein each translation proposal from amongst the first set is associated with at least one second metadata parameter;
 (vi) determining a first quality score for each translation proposal from amongst the first set by comparing the at least one first metadata parameter of the first segment with the at least one second metadata parameter of each translation proposal; and
 (vii) comparing the first quality score of each translation proposal with a first predetermined acceptance threshold, and wherein based on the comparison, when a first quality score of at least one translation proposal among the first set of translation proposals is greater than the first predetermined acceptance threshold, the method comprises:
  selecting a given translation proposal from amongst the at least one translation proposal; and
  providing the given translation proposal as an accepted translation of the first segment and as at least a part of an accepted translation of the source text.

In another aspect, an embodiment of the present disclosure provides a system for translating a source text of a first language to a second language, the system comprising at least one processor configured to:
 (i) receive a translation request, from a user device communicably coupled to the at least one processor via a data communication network, wherein the translation request comprises the source text in the first language;
 (ii) select, from the source text, at least a first segment;
 (iii) associate at least one first metadata parameter with the first segment;
 (iv) provide the first segment to a first translation memory for determining a first set of translation proposals corresponding to the first segment, wherein the first set of translation proposals are in the second language;
 (v) obtain the first set of translation proposals from the first translation memory, wherein each translation proposal from amongst the first set of translation proposals is associated with at least one second metadata parameter;

(vi) determine a first quality score for each of translation proposal from amongst the first set by comparing the at least one first metadata parameter of the first segment with the at least one metadata parameter of each translation proposal; and (vii) compare the first quality score of each translation proposal with a first predetermined acceptance threshold, and wherein based on the comparison, when the first quality score of at least one translation proposal among the first set of translation proposals is greater than the first predetermined acceptance threshold, the at least one processor is configured to:

select a given translation proposal from amongst the at least one translation proposal; and provide the given translation proposal as an accepted translation of the first segment and as at least a part of an accepted translation of the source text to the user device.

In yet another aspect, an embodiment of the present disclosure provides a method for translating a source text of a first language to a second language, the method comprising:

(I) receiving a translation request, wherein the translation request comprises the source text in the first language;

(II) selecting, from the source text, at least a first segment;

(III) associating at least one first metadata parameter with the first segment;

(III.1) generating a set of versions of the first segment and associating the said at least one first metadata parameters with each of the versions of the set of versions;

(IV) providing each of the generated set of versions a first translation memory for determining a first set of translation proposals corresponding to the set of versions, wherein the first set of translation proposals are in the second language;

(V) obtaining the first set of translation proposals from the first translation memory, wherein each translation proposal from amongst the first set is associated with at least one second metadata parameter;

(VI) determining a first quality score for each translation proposal from amongst the first set by comparing the at least one first metadata parameter with the at least one second metadata parameter of each translation proposal; and (VII) comparing the first quality score of each translation proposal with a first predetermined acceptance threshold, and wherein based on the comparison, when a first quality score of at least one translation proposal among the first set of translation proposals is greater than the first predetermined acceptance threshold, the method comprises:

selecting a given translation proposal from amongst the at least one translation proposal; and providing the given translation proposal as an accepted translation of the first segment and as at least a part of an accepted translation of the source text.

Embodiments of the present disclosure substantially eliminate or at least partially address the aforementioned problems in the prior art and enable efficient, accurate, and reliable translations of the source text.

Additional aspects, advantages, features and objects of the present disclosure will be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF DRAWINGS

Embodiments of the present disclosure will now be described, by way of example only, with reference to the following diagrams wherein.

DETAILED DESCRIPTION OF EMBODIMENTS

Figure 1:
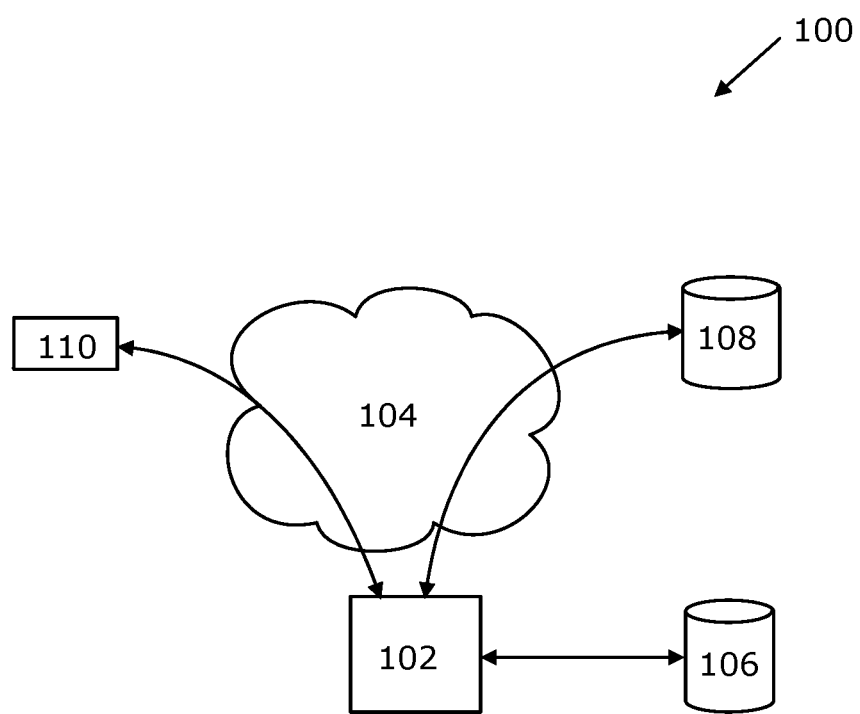
FIG. 1 illustrates a high-level architecture of a system for translating a source text of a first language to a second language, in accordance with an embodiment of the present disclosure.

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

In an aspect, the present disclosure provides a method for translating a source text of a first language to a second language, the method comprising:

(i) receiving a translation request, wherein the translation request comprises the source text in the first language;

(ii) selecting, from the source text, at least a first segment;

(iii) associating at least one first metadata parameter with the first segment;

(iv) providing the first segment to a first translation memory for determining a first set of translation proposals corresponding to the first segment, wherein the first set of translation proposals are in the second language;

(v) obtaining the first set of translation proposals from the first translation memory, wherein each translation proposal from amongst the first set is associated with at least one second metadata parameter;

(vi) determining a first quality score for each translation proposal from amongst the first set by comparing the at least one first metadata parameter of the first segment with the at least one second metadata parameter of each translation proposal; and (vii) comparing the first quality score of each translation proposal with a first predetermined acceptance threshold, and wherein based on the comparison, when a first quality score of at least one translation proposal among the first set of translation proposals is greater than the first predetermined acceptance threshold, the method comprises:

selecting a given translation proposal from amongst the at least one translation proposal; and providing the given translation proposal as an accepted translation of the first segment and as at least a part of an accepted translation of the source text.

In another aspect, the present disclosure provides a system for translating a source text of a first language to a second language, the system comprising at least one processor configured to:

(i) receive a translation request, from a user device communicably coupled to the at least one processor via a data communication network, wherein the translation request comprises the source text in the first language;

(ii) select, from the source text, at least a first segment;

(iii) associate at least one first metadata parameter with the first segment;

(iv) provide the first segment to a first translation memory for determining a first set of translation proposals corresponding to the first segment, wherein the first set of translation proposals are in the second language;

(v) obtain the first set of translation proposals from the first translation memory, wherein each translation proposal from amongst the first set of translation proposals is associated with at least one second metadata parameter;

(vi) determine a first quality score for each of translation proposal from amongst the first set by comparing the at least one first metadata parameter of the first segment with the at least one metadata parameter of each translation proposal; and (vii) compare the first quality score of each translation proposal with a first predetermined acceptance threshold, and wherein based on the comparison, when the first quality score of at least one translation proposal among the first set of translation proposals is greater than the first predetermined acceptance threshold, the at least one processor is configured to:

select a given translation proposal from amongst the at least one translation proposal; and provide the given translation proposal as an accepted translation of the first segment and as at least a part of an accepted translation of the source text to the user device.

In yet another aspect, an embodiment of the present disclosure provides a method for translating a source text of a first language to a second language, the method comprising:

(I) receiving a translation request, wherein the translation request comprises the source text in the first language;

(II) selecting, from the source text, at least a first segment;

(III) associating at least one first metadata parameter with the first segment;

(III.1) generating a set of versions of the first segment and associating the said at least one first metadata parameters with each of the versions of the set of versions;

(IV) providing each of the generated set of versions a first translation memory for determining a first set of translation proposals corresponding to the set of versions, wherein the first set of translation proposals are in the second language;

(V) obtaining the first set of translation proposals from the first translation memory, wherein each translation proposal from amongst the first set is associated with at least one second metadata parameter;

(VI) determining a first quality score for each translation proposal from amongst the first set by comparing the at least one first metadata parameter with the at least one second metadata parameter of each translation proposal; and (VII) comparing the first quality score of each translation proposal with a first predetermined acceptance threshold, and wherein based on the comparison, when a first quality score of at least one translation proposal among the first set of translation proposals is greater than the first predetermined acceptance threshold, the method comprises:

selecting a given translation proposal from amongst the at least one translation proposal; and providing the given translation proposal as an accepted translation of the first segment and as at least a part of an accepted translation of the source text.

The present disclosure provides the method for translating the source text of the first language to the second language. Herein, the source text refers to any type of text received for the translation, in which the source text is in the first language. That is, the method is configured for translating the source text of the first language into the second language received from any text source, such as from the Internet or the like. The first language and the second language may be any language including, but not limited to, English, French, Spanish, German, Finnish, Hindi, Russian, Latin, and the like.

The method comprises receiving a translation request, wherein the translation request comprises the source text in the first language. The translation request refers to a request sent by a user or a device, to translate the source text present in the first language, for example, English to the second language, for example, Spanish. It will be appreciated that the first language may be any language (official or designated, or unofficial) and may not be limited to the aforementioned languages. Generally, the source text in the first language comprises line(s) of text, paragraph(s) of text, or complete files of machine-readable text. Optionally, the source text comprises non-machine-readable text, wherein the non-machine-readable source text is scanned using external scanning means and converted to machine-readable text using techniques such as Optical Character Recognition (OCR) or the like, to be read and then translated using the present method.

The method comprises selecting, from the source text, at least a first segment. Typically, the source text comprises of a plurality of text segments, wherein the selection of the text segments is performed to preserve the meaning or inference of individual text segments and the source text as a whole. Herein, the method comprises selecting from the source text (i.e., from the plurality of text segments), at least the first segment. The first segment may be a word, phrase, sentence(s), paragraph(s), or the entire text of source text. In some examples, the text segments may also comprise special characters, bullet points, greetings, numbers and the like without any limitations. Beneficially, the selection of the first segment from the source text is done in a manner so as to preserve the meaning of both the first segment and the source text individually and in combination. Moreover, the method is configured to obtain different sets of the first segment to determine accurate translations of the source text from the first language to the second language.

Optionally, the selection of the first segment is performed based on at least one of: a punctuation, a conjunction, a formatting, a context, associated with the source text. In other words, the first segment may be selected based on each or at least some of punctuation(s), conjunction(s) or formatting(s) present in the source text. In another example, the first segment may be formed based on the context of the first segment with respect to the source text or based on the context (for example, topic or field, etc.) of the entire source text. Such context may be determined based on known techniques which are known in the art and thus not described in detail herein.

In an exemplary scenario, there may be a translation request received from a user, which includes a first source text in English to be translated to Spanish. For instance, the source text is a conversation between two persons, John and Fraser. Thus, the method may be configured for translating the source text of the first language (i.e., English) to the second language (i.e., Spanish). Herein, the method includes selecting at least the first segment from the source text. Specifically, the first segment is selected from the source text based on dialects and/or sentences present in the conversation between John and Fraser. For example, the first source text provided in the translation request may be: "Hi Fraser, thank you for your inquiry. Your shipment has been sent to your address: Main Street 7 00140 Helsinki, and you will receive a verification to your telenumber: 040 123 456. Thanks for your message!—John". As discussed, based on the provided first source text, the method is configured to select at least the first segment. To obtain a complete translation of the source text, in the present example, the present method may select five distinct segments, namely: a first segment: Hi Fraser, a second segment: thank you for your inquiry, a third segment: Your shipment has been sent to your address, Main Street 7 00140 Helsinki, and you will receive a verification to your telenumber, 040 123 456, a fourth segment: Thanks for your message! and a fifth segment: John. Herein, the selected five distinct segments indicate different types of sentences in the source text to be translated and enables the method to translate the source text in a parallel manner and thus enabling parallel processing of the source text translation to provide accurate and faster translations.

The method further comprises associating at least one first metadata parameter with the first segment. Herein, the first segment selected from the source text is associated with the at least one first metadata parameter. The term "metadata parameter" refers to a set of parameters configured to describe and provide information about other data such as, the source text or the first segment. The first metadata parameter is configured to provide information relating to the first segment (or the source text); and, as a result, enables the method to further propose translations of the first segment and/or the source text.

Optionally, the association of the at least one first metadata parameter with the first segment is based on at least one of: a meaning of text in the first segment, a context of the text in the first segment, a pre-set logic for metadata parameter association. Herein, the pre-set logic comprises at least one of a name, industry (of the customer), original source (e.g., application sending the request), values based on customer preferences (e.g., tone of voice). For instance, the first metadata parameter comprises, but is not limited to, at least one of: a type of text (i.e., formal, or informal), a domain (such as, healthcare, banking, etc.), a sentiment (such as, positive, negative, neutral, etc.), a gender (such as, masculine, feminine, etc.), an identity (such as, name or ID of an object, place, person, organization, etc.), a locale (such as, "Latin" for Spanish, "Canadian" for French), a sentiment (such as, positive, negative, neutral), and other possible metadata categories including source text type (such as, instruction manual, medical thesis, literary book or novel, regulation manual, etc.), a location within the metadata category (such as, introduction part of the manual, preface of the medical thesis, etc.) and so forth. It will be appreciated that the first metadata parameters may include any type of metadata parameter that may potentially lead to an accurate translation of the first segment and/or the source text.

Optionally, the source text is allocated with at least one first metadata parameter, wherein the first metadata parameter may be hierarchical. In an example, the source text is associated with a first metadata parameter indicating type of text, such as "instruction manual". Further, the first segment selected from the source text may include additional sub-metadata parameters such as a first sub-metadata parameter indicating location of text, such as "introduction part of the manual" or "technical part of the manual" or "legal part of the manual". Typically, depending upon the at least one first metadata, different versions of the selected first segment may be formed. For example, based on the first metadata such as "legal part of the manual", "technical part of the manual", the first segment may be provided to a specialized translation memory trained in the specific domain i.e., "legal" and "technical" domains, respectively. In some examples, the entire source text may be associated with the first metadata parameter without any limitations.

The method comprises providing the first segment to a first translation memory for determining a first set of translation proposals corresponding to the first segment, wherein the first set of translation proposals are in the second language. Herein, the "translation memory" refers to a database configured to store the source text and/or the first segment in the first language with their corresponding translation proposals in the second language with associated first metadata parameters. Typically, the first segment is provided to the first translation memory for providing the first set of translation proposals in the second language. The first translation memory is configured to translate the selected first segment in the first language based on the associated at least one metadata parameter and provide the first set of translation proposals in the second language.

In an example, the first segment may be "Can you do this medical exam?". Herein, the first segment is in the first language (i.e., English). Further, the first segment may be associated with three metadata parameters of the at least one first metadata parameter. The first metadata parameters include: "formal", "cs", "healthcare". Thus, the first translation memory is configured to translate the first segment based on the at least one first metadata parameter and provide the first set of translation proposals in the second language (for example, Spanish). Herein, the first translation memory translates the first segment into a set having two translation proposals or versions (i.e., #1 and #2) of the first segment. The first set of translation proposals provided by the first translation memory for the first segment "Can you do this medical exam?" may be:

1. ¿Puedes hacer este examen médico?; first metadata parameters: "informal", "cs", "healthcare"

2. ¿Puede usted hacer este examen médico?; second metadata parameters: "formal", "cs", "healthcare".

Herein, since the second metadata parameters (i.e., "formal", "cs", "healthcare") matches or fits with the first metadata parameters of #2, the #2 may be selected as the proposed translation.

In similar example, with the first segment being "Can you do this medical test?", and with the first segment in the first language (i.e., English) is associated with three metadata parameters of the at least one first metadata parameter. The first metadata parameters include: "formal", "cs", "healthcare". Thus, the first translation memory is configured to translate the first segment based on the at least one first metadata parameter and provide the first set of translation proposals in the second language (for example, Spanish). Herein, the first translation memory translates the first segment into a set having two translation proposals or versions (i.e., #1 and #2) of the first segment. Notably, during translation of the first segment, the first translation memory does not find a match for the first segment and hence varies the first segment or the first metadata parameters to obtain the translated first segment. In such case, the first set of translation proposals provided by the first translation memory for the first segment "Can you do this medical test?" may be:

1. ¿Puedes hacer esta prueba médica?, wherein the #1 translation is selected as the proposed translation.

Moreover, optionally, each translation memory comprises one pair of source-target sentences, with no way of distinguishing between multiple forms of translations of the same sentence. For example, the translation for "Hän tulee" (in Finnish) is "He comes" (in Finnish), whereas "Hän tulee" also translates to "She comes" and thus would overwrite the previous entry. Thus, to overcome aforementioned problem, the method comprises additional metadata parameters in the source-target pairs in the forms of tags, such that similar matches may be ranked and/or ruled out. Thus, the translation for "Hän tulee" i.e., "He comes" is associated with a first metadata parameter ["masculine", "customer A", "customer support"]. Notably, these tags can be used either to rank (i.e., sentence-pair with most relevant tags) or rule out (for example, do not match if "feminine") and further the metadata parameter indicates the context of the text segment (or source text) that are used to determine the accuracy and/or quality of translation.

Moreover, optionally, the first metadata parameter is added to an incoming message by several methods: app sending the data (for example, Zendesk app knows if it's an email or FAQ page, the method knows the sender to be Zendesk), customer records (i.e., domain, preferences), and analysing the incoming content (i.e., domain, sentiment) and so forth.

It may be understood that, generally, the translation request comprises the source text and the selected first segments. Additionally, the translation memory comprises information relating to the client and at least one domain, that is beneficially used as metadata. However, the translation request may comprise tags (such as, <head>) or codes (such as, C or HTML codes), links (such as, weblinks or hyperlinks), such that even if the link changes in the source text, the translation memory may still be able to provide a match.

The method further comprises obtaining the first set of translation proposals from the first translation memory, wherein each translation proposal from amongst the first set is associated with at least one second metadata parameter. That is, upon determining the first set of translation proposals via the first translation memory, the method comprises obtaining the first set of translation proposals of the first segment in the second language from the first translation memory. Typically, upon obtaining the first set of translation proposals, each of the first set of translation proposals is associated with at least one second metadata parameter for further verifying and obtaining an accurate translation of the first segment and/or the source text. The second metadata parameter (similar to the first metadata parameter) is configured to provide information relating to each of the first translation proposal to enable the method to determine an accurate translation amongst the first set of translation proposals. Beneficially, the second metadata parameter enables the method to quantitatively and/or qualitatively compare each translation proposal amongst the first set of translation proposals, to determine the most accurate translation in an efficient manner.

The method further comprises determining a first quality score for each translation proposal from amongst the first set by comparing the at least one first metadata parameter of the first segment with the at least one second metadata parameter of each translation proposal. That is, upon associating each translation proposal amongst the first set of translation proposals with the at least one second metadata parameter, the method comprises determining the first quality score for each translation proposal by comparing the at least one first metadata parameter of the first segment with the at least one second metadata parameter of each translation proposal. The term "quality score" refers to a parameter indicating the quality of the translation based on the comparison of the at least one first metadata parameter of the first segment and the at least one second metadata parameter of each translation proposal. In some examples, the quality score generally ranges between 0 and 1.

Optionally, the comparison of the at least one first metadata parameter with the at least one second metadata parameter comprises calculating an edit-distance between the first segment and each translation proposal of the first set of translation proposals such as, but not limited to, using Levenshtein distance. The edit distance measures the number of edits required to transform one text to another. For example, "test" and "test" have edit distance of '0', whereas "test" and "testing" have edit distance of '3'. Notably, only distances of '0' are considered full memory matches, such that misspellings or alternative words or versions of the first segment will never result in full matches.

Optionally, the first quality score may lie in a range of −1 to 1. Herein, the basis of comparison may be a numeric metric, a similarity metric, a context metric, a relative metric and so forth. Alternatively stated, the first quality score may simply be a number based on how many metadata items match, with weighting based on more relevant metadata. For example, the first segment or the source text comprises tags (of first or second metadata parameter) for "customer-name", "formality", "locale", "sentiment", wherein matching each tag of the first and second metadata parameters results in the first quality score of 1, or matching "customer-name" tag results in a first quality score of 0.5, matching "formality" adds 0.2 to the first quality score and thus resulting in a total first quality score of 0.7. In another example, matching of only the sentiment metadata parameter results in the first quality score of 0.1.

Typically, the first segment (or the source text) is analysed using similarity metrics (e.g., sentence embeddings) and matched with alternative versions (or proposals) of the first segment based on the similarity metric and wherein each of the mappings are matched with the first translation memory (or the specialized translation memory) to obtain the relevant matching translation proposals and based on which, the translation proposal having the highest first quality score may be selected. Herein, each segment of the first set of translation proposals is analysed to determine the first quality score of each translation proposal for the first segment. Each of the translated versions have associated respective metadata parameters, wherein the quality score is determined by comparing the first metadata parameter of the first segment to be translated (or segment versions) and with the second metadata parameter associated with the first translation proposals. Additionally, the method comprises determining the first quality score i.e., the quality analysis is performed on each segment and translation proposal, or a version thereof. Alternatively, the quality analysis may be performed on different versions of the translational proposals, wherein the different versions of the translation proposals are constructed by making permutations and combinations of the first set of translation proposals. One possible way to create a quality score is to count number of one to one matching metadata parameters and select as highest score the one which most matches. Further the count number could be normalized by dividing it by total number of first or second metadata parameters in given session of translation. The normalized value would be in this scenario quality score. One additional way to create the quality score is to count how many of the metadata parameters do not match.

In an example, different versions of a given segment, such as SE1, SE2, SE3, SE4 and SE5 correspond to the segments of at least the first segment (or the source text). Herein, the method comprises translating the different versions of the given segment to provide corresponding first set of translation proposals i.e., SE1.1, SE1.2 (i.e., version 1 and 2 of the first segment), SE2.1, SE3.1, SE3.2 (i.e., version 1 and 2 of the third segment), SE3.3, SE4.1, SE5.1. Herein, the method comprises determining the first quality score for each translation proposal amongst the first set of translation proposals based on comparison of the associated first and/or second metadata parameters.

In the present example, the first quality score for each of the proposed translations may be:

| Segment | Quality score (0-1) |
|---------|---------------------|
| SE1.1   | 0.9                 |
| SE1.2   | 0.8                 |
| SE2.1   | 0.4                 |
| SE3.1   | 0.3                 |
| SE3.2   | 0.5                 |
| SE3.3   | 0.6                 |
| SE4.1   | 0.9                 |
| SE5.1   | 1.0                 |

Thus, based on the determined first quality scores of each translation proposal, the proposed translation is selected as SE1.1, SE2.1, SE3.3, SE4.1, SE5.1.

The method further comprises comparing the first quality score of each translation proposal with a first predetermined acceptance threshold. Typically, upon determining the first quality score for each translation proposal amongst the first set of translation proposals, the method comprises comparing the first quality score of each translation proposal with the first predetermined acceptance threshold. The term "predetermined acceptance threshold" refers to a threshold parameter of the first quality score, wherein for the translation proposals to be accepted as an acceptable (matching or possible) translation, the determined first quality score of the given translation proposal must be greater than the predetermined acceptance threshold. In an example, the predetermined acceptance threshold may lie between 0.5 and 1 (for comparison of the first quality score), based on the requirement of the implementation. For example, the predetermined acceptance threshold may be 0.5, 0.6, 0.78, 0.85, 0.99, 1, etc.

Based on the comparison of the first quality score of each translation proposal, amongst the first set of translation proposals, with the predetermined acceptance threshold, the method comprises selecting the at least one translation proposal amongst the first set of translation proposals having the first quality score higher than the predetermined acceptance threshold. Typically, the first quality scores of each of the firsts set of translation proposals is compared with each other to enable the method to select the most suitable match or accurate translation of the first segment (or the source text) in a reliable and effective manner. Beneficially, the irrelevant and ambiguous translations amongst the first set of translation proposals are discarded to provide the at least one translation proposal that is accurate to at least a desired degree, and in a faster and efficient manner that is attributed to the reduced memory consumption and lower amount of data to be processed via the method.

In an embodiment, the at least one translation proposal comprises a plurality of translation proposals, wherein the plurality of translation proposals having a plurality of first quality scores. The at least one translation proposal may comprise the plurality of translation proposals having the respective plurality of first quality scores, and wherein a first quality score of the given translation proposal is a highest first quality score from amongst the plurality of first quality scores. Typically, each of the at least one translation proposal is compared with each other based on the corresponding first quality score, to enable the method to select the given translation proposal having the maximum first quality score amongst the plurality of first quality scores. Beneficially, the selection of the given translation proposal having the maximum quality score ensures the selection of the most relevant and/or accurate translation in an effective manner. Furthermore according to optional embodiment, the provided translation proposals can be rendered in an user interface. Beneficially highest quality score proposal is presented at the top and in one scenario a number of proposal can be limited to maximum 2, 3, 4, 5, 6, 7 or other suitable number to make user interface more easy to use.

The method further comprises providing the given translation proposal as an accepted translation of the first segment and as at least a part of an accepted translation of the source text. That is, upon selecting the given translation proposal amongst the at least one translation proposal based on the comparison of the first quality score therein, the method comprises providing the given translation proposal as the accepted translation of the first segment and as at least a part of the accepted translation of the source text. Beneficially, the given translation proposal having the most relevant and/or suitable translation is selected by the method amongst the at least one translation proposal as the accepted translation to provide accurate and reliable translations.

In an embodiment, wherein when the first quality score of each translation proposal is lesser than the first predetermined acceptance threshold, the method comprises providing the first segment to a second translation memory for determining a second set of translation proposals corresponding to the first segment, wherein the second set of translation proposals are in the second language. That is, if based on the comparison of the first quality score of each translation proposal amongst the first set, none of the proposed translation exceed the predetermined acceptance threshold, the method comprises providing the first segment to the second translation memory. The "second translation memory" refers to another type of database (similar to the first translation memory) comprising extensive translation and characteristic information related to the first segment. For example, the second translation memory may be a specialized database, a public database, or a private database, that may allow the method to determine relevant translations that the first translation memory was unable to provide. Beneficially, in cases wherein a required or relevant match i.e., based on the predetermined acceptance threshold is not found, the method enables obtaining relevant translations from other (internal or external) translation memories.

Further, optionally, the method comprises obtaining the second set of translation proposals from the second translation memory, wherein each translation proposals from amongst the second set of translation proposals is associated with at least one second metadata parameter. Furthermore, optionally, the method comprises determining a second quality score for each translation proposal from amongst the second set by comparing the at least one first metadata parameter of the first segment with the at least one second metadata parameter of each translation proposal. Furthermore, optionally, the method comprises comparing the second quality score for each translation proposal with a second predetermined acceptance threshold, and wherein based on the comparison, when a second quality score of at least one translation proposal among the second set of translation proposals is greater than the second predetermined acceptance threshold, the method comprises selecting a given translation proposal from amongst the at least one translation proposal and providing the given translation proposal as an accepted translation of the first segment and as at least part of an accepted translation of the source text. The implementations of these steps may be contemplated by a person skilled in the art based on description in the preceding paragraphs, and thus have not been repeated herein for the brevity of the present disclosure.

In an embodiment, the method also comprises selecting, from the source text, a second segment, and performing the (aforementioned) steps of the method on the second segment to update the translation of the source text. Typically, upon obtaining the accepted translation of the first segment and part of the accepted source text translation, the method further comprises selecting the second segment, different from the first segment, from the source text to obtain translation for the second segment and another part of the accepted source text translation so as to update the translation of the source text. Herein, the second segment (similar to the first segment) is associated with a given metadata parameter and compared to the metadata parameter of at least one second translation proposal (i.e., the translation proposals of the second segment) to determine a second quality score for each of the at least one second translation proposal. Beneficially, the method enables updation and/or completion of the translation of the source text by individually selecting text segments from the given source text and thereby allowing the method to performing steps of the method on individual text segments in a parallel manner to determine the at least one second translation proposal in a faster and more efficient manner.

In an embodiment, the method comprises processing a given segment for generating at least one version of the given segment and performing one or more steps of the method on the at least one version. The term "given segment" refers to either the "first segment", the "second segment" or combination of both "the first segment and the second segment". Typically, the method comprises processing the given segment for generating the at least one version of the given segment (i.e., the first segment and/or the second segment) to perform the steps of the method thereat to further determine different versions of given translation proposals. Beneficially, the method enables generation of the different versions of the translation proposals that further enables the method to select a required version of the translation proposal amongst the different versions based on at least the metadata parameters to provide an accurate and reliable translation. The "processing" of the given segment refers to different operations and techniques being performed on the given segment to generate different versions thereof. There may be several techniques to generate the different versions of the given segment and/or the translation proposals, wherein at least one of the generate different versions is used by the method as a translation proposal. This is beneficial as it is thus possible to obtain a large set of translation proposal. One set of translation proposals are from a first version of the segment and other set from a second version of the segment etc.

Optionally, the processing comprises applying aggressive reductions of names, addresses, brand names, chosen terminology and characters to filter out non-relevant words preventing matches, and only then searching for translation matches. Also, if the previous method (i.e., aggressive redaction) does not yield any matches, the processing further comprises autocorrecting the segments and performing the edit distance match again and performing automatic paraphrasing (e.g., with PARROT T5 model, or the like) for finding out different versions of the same sentences and running the edit-distance match again with the results.

Optionally, the processing comprises running a multilingual sentence representations algorithm (e.g., LASER/BERT) and turning the original sentence to a vector, then searching for the translation memory sentence with the least vector distance (i.e., within threshold), which beneficially results in a higher number of memory matches in comparison to conventional systems and methods.

Optionally, the step of processing the given segment comprises at least one of: changing a word order in the given segment, omitting at least one word in the given segment, adding at least one word in the given segment, paraphrasing the given segment, correcting at least one spelling error in the given segment, generating an alternative expression for the given segment, vectorizing the given segment. In an example, the given segment is mapped into corrected versions, that include omitting/correcting spelling errors. For instance, a first segment is: "Thks for your message!", wherein a first version of the first segment is: "Thank you for your message" that comprises the corrected version of the given segment. In another example, the given segment is mapped into alternative versions by changing the word order i.e., by using different expressions to provide a set of different variations of expressions and wordings for the given segment. For instance, a first segment is: "thank you for your inquiry", wherein a first version of the first segment is: "thank you for your request". In another instance, a second segment is: "Thanks for your message!", wherein a first version of the second segment is: "Thank you for your message", a second version of the second segment is: "Thanks for the message", a third version of the second segment is: "Thanks for reaching out". In yet another example, the given segment is mapped into alternative versions with different word orders, omitted/added words that does not change the meaning of the segment (or the source text), i.e., the segment is paraphrased. For instance, a third segment is: "Your shipment has been sent to your address, and you will receive a verification to your phone number.", wherein a first version of the third segment is: "Your shipment has been sent to you, and you will receive a verification to your phone number.", a second version of the third segment is: "The shipment has been sent to_your address, and you will receive a verification to your phone number.", a third version of the third segment is: "The shipment has been sent to your address, and you will receive a verification to your smart phone number." In still another example, the given segment is mapped into alternative versions without caps and extra spaces. For instance, a fourth segment is: "_Thank_you_for_your_message_!", wherein a first version of the fourth segment is: "Thank you for your message!"

Further, optionally, the given segment is mapped into alternative versions by vectorizing the given segment. Herein, the given segment is analysed based on the metadata parameters and matched with the alternative versions based on the metadata parameters, such as using similarity metrics including, but not limited to, sentence embeddings. Typically, the given segment is mapped into vectors of real numbers by using language modelling and feature learning techniques such that the segments with similar meaning are expected to be closer in the vector space, wherein the mapping into vectors comprises mathematical embedding from space with many dimensions per segment to a continuous vector space having a much lower dimension.

Optionally, the method further comprises pre-processing a given segment, prior to providing the given segment to a given translation memory, for determining a first type of text and a second type of text in the given segment. That is, before providing the given segment (i.e., the first or second segment of the source text) to the given translation memory (i.e., the first or second translation memory), the method comprises pre-processing the given segment to determine the first type of text and the second type of text therein. The "second type of text" refers to pre-translated text or text that does not require any translation, such as, but not limited to, proper nouns, numerals, symbols and so forth. Further, upon determining the second type of text in the given segment, the method further comprises removing the second type of text from the given segment to include only the first type of text in the given segment. Beneficially, by removing the second type of text from the given segment, the memory consumption is reduced and also the method is required to process a lower number of text/words to provide the translation of the given segment and hence provides a faster and efficient translation.

Optionally, the second type of text does not require translation and comprises at least one of: a proper noun, an identification information, a symbol, a numeral, a web link, a punctuation. For example, the second type of text comprises all text that does not require translation or does not have an appropriate translation including, but not limited to, a proper noun, an identification information, a symbol, a numeral, a web link, a punctuation. Herein, the second type of text may also include headers and codes provided in the source text, such as an opening header <head h1> and closing header </head h1> to signify the start and end of the source text. It will be appreciated that the method enables to read different type of texts and codes (such as, but not limited to, C, C++, HTML, CSS, Javascript, C #, and so forth) to derive inference therefrom and accordingly execute the steps of the method to obtain the required translation.

Optionally, the method further comprises removing a second type of text from the external translation request. Herein, based on the privacy rules and regulations (GDPR), the personal and/or confidential information is redacted from the external translation request to beneficially ensure a secure and privacy aware translation of the source text and compliance with privacy and security regulations. For example, the at least one first metadata parameter is related to a text type such as "General Data Protection Regulation (GDPR) metadata parameter" indicating the associated text is subject to privacy settings. The GDPR General Data Protection Regulation is a regulation in EU law on data protection and privacy in the European Union and the European Economic Area. In an example, based on the GDPR metadata parameter, the relevant text (to the GDPR) is removed from the translation, or the related text is only provided to a translation memory and not shared with other entities. Beneficially, the GDPR metadata parameter provides translations that is limited based on user profiles and thus enables the method to provide privacy aware management and allows selectively sharing the private translations i.e., the private translations are not provided directly to a user, prior to removing the GDPR related data. Moreover, the GDPR metadata enables the method to state ownership or relationship of the first segment or the source text, to a first party only. In said case, the translations generated for the first segment and/or the source text is not shared with other entities.

Herein, the given segment may be analysed to determine content which does not need translation i.e., the second type of text in the given segment. The given segment is analysed to determine the first type of text and the second type of text, wherein the second type of text is redacted from the given segment and only the first type of text is used as the given segment for the translation process. In an example, the first segment is: "Hi Fraser", wherein the pre-processed first segment is: "Hi <REDACTED_DATA>". In another example, the second segment is: "thank you for your inquiry", wherein the pre-processed second segment is: "thank you for your inquiry" (i.e., no redaction is done as the entire second segment comprises the first type of text only). In another example, the third segment is: "Your shipment has been sent to your address, Main Street 7 00140 Helsinki, and you will receive a verification to your telenumber, 040 123 456", wherein the pre-processed third segment is: "Your shipment has been sent to your address, <REDACTED_DATA>, and you will receive a verification to your telenumber, <REDACTED_DATA>" (i.e., a given segment might comprise one or more of the second type of text to be redacted). In another example, the fourth segment is: "Thanks for your message!", wherein the pre-processed fourth segment is the same as the fourth segment (i.e., no redaction is done as the entire fourth segment is of the first type only). In yet another example, the fifth segment is: "John", wherein the pre-processed fourth segment is "<REDACTED_DATA>" (i.e., a segment might comprise only the second type of text). This is beneficial as possible confidential client data is not sent to translation memory. Also this is beneficial since redacted data does not need translation.

Optionally, the method further comprising modifying an accepted translation of the given segment to include the second type of text. Herein, upon removing the second type of text, prior to providing the given segment, from the given segment, and upon receiving the accepted translation of the given segment, the method further comprises modifying the accepted translation of the given segment to include the second type of text that was redacted from the given segment before translation. Beneficially, by removing the second type of text, the method eliminates the need to process the second type of text during translation of the given segment and thus enables the method to provide faster translations of the given segment (due to reduced processing requirement). Alternatively, by including the second type of text, the method completes the accepted translation of the given segment to include the second type of text as well, to beneficially provide a complete and accurate translation. As an example redacted data is added to appropriate place of the translation. As an example for previous translation example "Your shipment has been sent to your address, <REDACTED_DATA>, "translation to Finnish of the segment would be "Tilauksenne on lähetetty osoiteeseen: <REDACTED_DATA>," and the accepted translation would be "Tilauksenne on lähetetty osoiteeseen: Main Street 7 00140 Helsinki".

In an embodiment, the step of pre-processing the given segment comprises at least one of: implementing natural language processing to determine language components in the given segment, classifying the language components in the given segment, semantically evaluating words in the given segment. The term "language component" refers to different basic components of any language such as, but not limited to, words, punctuations, numerals and the like. Herein, the method comprises one or more machine learning algorithms to perform natural language processing (NLP) to determine, classify and semantically evaluate the language components in the given segment.

Optionally, when a given quality score of each translation proposal of a given set of translation proposals corresponding to a given segment is lesser than a given predetermined acceptance threshold, the method further comprises transmitting an external translation request to an external source, wherein the external translation request comprises at least the given segment and receiving, from the external source, an external translation of the given segment. Typically, upon performing the steps of the method, if the given quality score (i.e., the first and/or second quality score) is lesser than the given predetermined acceptance threshold (i.e., the first and/or second predetermined acceptance threshold), the method further comprises transmitting the external translation request (similar to the translation request) to the external source. Herein, the external source refers to an external translation method or system ($3^{rd}$ party) that may provide the translation in case, the required translation is not obtained using the method. For example, the external source may be Google Translate™, human translator or any other external party capable of providing the source text translation.

In an embodiment, the source text comprises a plurality of segments, each segment is associated with one or more translation proposals, the one or more translation proposals having one or more quality scores associated therewith, and wherein the method further comprises generating a plurality of translation permutations, wherein each translation permutation comprises a single translation proposal for each segment. Herein, the method comprises generating the plurality of translation permutations for each segment to beneficially obtain all possible translations of the given segment and thereby selecting the most relevant or accurate translation. Further, the method comprises determining a cumulative quality score for each translation permutation and selecting, as the accepted translation of the source text, a given translation permutation having a highest cumulative quality score. Beneficially, different dialects and/or languages comprises different word orders and preferences and thus enabling the method to consider all possible permutations while determining the source text translation to provide the most accurate and reliable translation. Moreover, the method is configured to determine an optimum balance of translations, considering the source text as whole and each of the given segments individually as well.

In an example, different versions of a given segment i.e., SE1, SE2, SE3, SE4 and SE5 correspond to the segments of at least the first segment (or the source text). Herein, the method comprises translating the different versions of the given segment to provide corresponding first set of translation proposals i.e., SE1.1, SE1.2 (i.e., version 1 and 2 of the first segment), SE2.1, SE3.1, SE3.2 (i.e., version 1 and 2 of the third segment), SE3.3, SE4.1, SE5.1. Herein, the method comprises determining the first quality score for each translation proposal amongst the first set of translation proposals based on comparison of the associated first and/or second metadata parameters.

In the present example, the first quality score for each of the proposed translations are:

| Segment | Quality score (0-1) |
|---|---|
| SE1.1 | 0.9 |
| SE1.2 | 0.8 |
| SE2.1 | 0.4 |
| SE3.1 | 0.3 |
| SE3.2 | 0.5 |
| SE3.3 | 0.6 |
| SE4.1 | 0.9 |
| SE5.1 | 1.0 |

Thus, based on the determined first quality scores of each translation proposal, the proposed translation proposal is selected as SE1.1, SE2.1, SE3.3, SE4.1, SE5.1. Further, the at least one translation proposal is used to make different translation permutations such as:
permutation 1: SE1.1, SE2.1, SE3.3, SE4.1, SE5.1.
permutation 2: SE1.2, SE2.1, SE3.2, SE4.1, SE5.1.
permutation 3: SE1.1, SE2.1, SE3.1, SE4.1, SE5.1.

Herein, the given quality score is calculated over each of the permutations to determine the permutation having the highest quality score i.e., to find the most relevant permutation. Notably, the given quality score based on which the versions are selected does not indicate the most relevant or accurate translation proposal of the given segment, rather the given quality score provides the most relevant or accurate translation proposal of the source text (i.e., considering the overall big picture)

In an example, the method comprises calculating a standard deviation of the given quality scores of each permutation segment and selecting at least one permutation segment having the smallest standard deviation, further indicating that the proposed translation is in "balance". In the above example, the cumulative scores of permutation 1 is 3.8 (i.e., sum of quality scores), permutation 2 is 3.6, permutation 3 is 3.5 and as a result, based on the comparison of each permutation segment, the permutation 1 is selected as the proposed translation.

Further, in the above example, the quality score of SE2.1 was lower than the predetermined acceptance threshold. Thus, the versions of the text segments related to the second segment are transmitted to the second translation memory, wherein the second translation memory may also provide alternative versions of the translation proposals. For example, assuming the quality of SE2.1 is 0.7, then the additional translation proposals such as SE2.2 with quality score 0.7 is selected as the proposed translation. Beneficially, in cases wherein, the first translation memory is unable to provide sufficient results, the second translation memory can be used. Further, such an implementation also reduces the communication resources towards the second translation memory since only the segments having the quality score lesser than the predetermined acceptance threshold are sent to the second translation memory, thus reducing the computation time and resources required.

The present disclosure also provides a computer program product comprising a non-transitory computer-readable storage medium having computer program instructions stored thereon, the computer-readable instructions or the computer program code being executable by a computerized device comprising data processing hardware to execute the method for translating the source text of the first language to the second language. Typically, the method is implemented on a processor of the system to translate the source text of the first language to the second language. The computer program product may direct a computerized device, other programmable data processing apparatus, or other interacting computation devices to function in a particular manner, such that the instructions stored in the non-transitory computer-readable storage medium cause a series of steps to implement the function specified in a flowchart corresponding to the instructions. Examples of implementation of the non-transitory computer-readable storage medium include, but is not limited to, Electrically Erasable Programmable Read-Only Memory (EEPROM), Random Access Memory (RAM), Read Only Memory (ROM), Hard Disk Drive (HDD), Flash memory, a Secure Digital (SD) card, Solid-State Drive (SSD), a computer readable storage medium, and/or CPU cache memory. A computer readable storage medium for providing a non-transient memory may include, but is not limited to, an electronic storage device, a magnetic storage device, an optical storage device, an electromagnetic storage device, a semiconductor storage device, or any suitable combination of the foregoing.

Moreover, the present description also relates to the system for translating the source text from the first language to the second language as described above. The various embodiments and variants disclosed above apply mutatis mutandis to the present method.

The system comprises at least one processor configured to receive a translation request, from a user device communicably coupled to the at least one processor via a data communication network, wherein the translation request comprises the source text in the first language. Typically, a user via a user device transmits the translation request over a data communication network to the at least one processor (or the system), wherein the translation request comprises the source text of the first language to be translated to the second language.

The "at least one processor" refers to a structure and/or module that include programmable and/or non-programmable components configured to store, process and/or share information for translating a source text of a first language to a second language. Optionally, the at least one processor includes any arrangement of physical or virtual computational entities capable of enhancing information to perform various computational tasks. Moreover, the at least one processor refers to a computational element that is operable to respond to and processes instructions to perform the operations) for translating a source text of a first language to a second language. Optionally, the at least one processor includes, but is not limited to, a microprocessor, a microcontroller, a complex instruction set computing (CISC) microprocessor, a reduced instruction set (RISC) microprocessor, a very long instruction word (VLIW) microprocessor, or any other type of processing circuit, for example as aforementioned. Additionally, the at least one processor is arranged in various architectures for responding to and processing the instructions for translating a source text of a first language to a second language in the system. Furthermore, it will be appreciated that at least one processor may be implemented as a hardware processor and/or plurality of hardware processors operating in a parallel or in a distributed architecture. Optionally, the processors in the at least one processor are supplemented with additional computation methods, such as neural networks, and hierarchical clusters of pseudo-analog variable state machines implementing artificial intelligence algorithms. In an example, the at least one processor may include components such as a memory, a data communication interface, a network adapter, and the like, to store, process and/or share information with other computing devices, such as the user device, translation memories. Optionally, the at least one processor is implemented as a computer program that provides various services (such as database service) to other devices, modules, or apparatus.

The "data communication network" relates to an arrangement of interconnected, programmable and/or non-programmable components that, when in operation, facilitate data communication between one or more computation devices and/or databases. The data communication network allows for communication among the interacting computation devices (such as, the user device, or the translation memory, etc.). In other words, the user device, the translation memory is capable of communicating with other computation devices (such as the at least one processor) via the data communication network. Further, the data communication network includes, but is not limited to, a peer-to-peer (P2P) network, ring communication networks, a hybrid peer-to-peer network, local area networks (LANs), radio access networks (RANs), metropolitan area networks (MANs), wide area networks (WANs), all of or a portion of a public network such as global computer network known as the Internet®, a private network, a cellular network, and any other communication system. Additionally, optionally, the data communication network employs wired or wireless communication that can be carried out via one or more known protocols, including, but not limited to, Internet Protocol (IP), Wireless Access Protocol (WAP), Frame Relay, or Asynchronous Transfer Mode (ATM), Bluetooth® and the like. Moreover, any other suitable protocols using voice, video, data, or combinations thereof, can also be employed, for example, VoIP.

The at least one processor is configured to select, from the source text, at least a first segment. Typically, the source text to be translated is split to distinct text segments (i.e., at least the first segment) to enable the system to translate the source text in a parallel manner and thus enabling parallel processing of each segment to provide faster translations.

The at least one processor is configured to associate at least one first metadata parameter with the first segment. Typically, the first segment is associated with at least one first metadata parameter, wherein the first metadata parameters enable the system to derive inferences therefrom and obtain accurate and reliable translations. For example, the first segment is associated with the first metadata parameter (such as, text type).

The at least one processor is configured to provide the first segment to a first translation memory for determining a first set of translation proposals corresponding to the first segment, wherein the first set of translation proposals are in the second language. Typically, the first segment is provided to the first translation memory, wherein each of the first segment is associated with at least one first metadata parameter. Herein, the first translation memory is configured to provide the first set of translation proposals for the first segment, wherein each translation proposal amongst the first set of translation proposals may also be associated with metadata parameters.

Optionally, the system further comprises the first translation memory, wherein the first translation memory is communicably coupled to the at least one processor.

Optionally, the system further comprises a second translation memory, wherein the second translation memory is communicably coupled to the at least one processor.

The at least one processor is configured to obtain the first set of translation proposals from the first translation memory, wherein each translation proposal from amongst the first set of translation proposals is associated with at least one second metadata parameter. Herein, the at least one processor is configured to obtain the first set of translation proposals, wherein each translation proposal is associated with the second metadata parameter to further enable comparison of the translation proposals based on at least the metadata for providing accurate and reliable translations.

The at least one processor is configured to determine a first quality score for each of translation proposal from amongst the first set by comparing the at least one first metadata parameter of the first segment with the at least one metadata parameter of each translation proposal. The first quality score indicates a level of matching (or relevance) of each of the translation proposals to enable a quantitative and/or qualitative analysis of the translation proposals. The metadata parameters are used to determine the first quality score and further translations for the first segment is selected based on the first quality score (for example, selecting translation proposal with the highest quality score). The first quality score is calculated by comparing the first metadata parameter of the first segment with the second metadata parameter of each of the first set of translation proposals. For example, a version with highest first quality score can be selected.

The at least one processor is configured to compare the first quality score of each translation proposal with a first predetermined acceptance threshold, and wherein based on the comparison, when the first quality score of at least one translation proposal among the first set of translation proposals is greater than the first predetermined acceptance threshold, the at least one processor is configured to select a given translation proposal from amongst the at least one translation proposal and provide the given translation proposal as an accepted translation of the first segment and as at least a part of an accepted translation of the source text to the user device. Herein, based on the comparison of the first quality score of each translation proposal with the predetermined acceptance threshold, the at least one processor is configured to select the at least one translation proposal having the first quality score higher than the predetermined threshold and further select the given translation proposal (comprising the relevant or required translation) therefrom. Beneficially, the system enables generation of multiple translation proposals for each of the text segments of the source text and allows selection of an appropriate quality from the provided translation proposals based on requirement. Further, beneficially, when a sufficient quality of the translation proposal available from the first translation memory is not provided, the system may transmit the translation request to the second translation memory system to obtain a required translation having a given quality score greater than predetermined acceptance threshold. Further, additionally, the translation proposals provided by the second translation memory may be used to update the first translation memory i.e., the accepted translation of the first segment or the source text.

Optionally, if the first set of translation proposals has a first quality score lower than predetermined acceptance threshold, then the segment with the low first quality score is transmitted to a second translation memory, wherein the first set of translation proposals associated with the first segment are received and the at least one translation proposal with best score is selected as the accepted translation. This is beneficial as the first translation memory can be allocated to bulk type of translations wherein the focus is on volume and the second translation memory can be allocated to special cases. Indeed often the special cases might require more calculation power than bulk cases.

In yet another aspect, the present disclosure also provides another method for translating a source text of a first language to a second language, the method comprising:
 (I) receiving a translation request, wherein the translation request comprises the source text in the first language;
 (II) selecting, from the source text, at least a first segment;
 (III) associating at least one first metadata parameter with the first segment;
 (III.1) generating a set of versions of the first segment and associating the said at least one first metadata parameters with each of the versions of the set of versions;
 (IV) providing each of the generated set of versions a first translation memory for determining a first set of translation proposals corresponding to the set of versions, wherein the first set of translation proposals are in the second language;
 (V) obtaining the first set of translation proposals from the first translation memory, wherein each translation proposal from amongst the first set is associated with at least one second metadata parameter;
 (VI) determining a first quality score for each translation proposal from amongst the first set by comparing the at least one first metadata parameter with the at least one second metadata parameter of each translation proposal; and
 (VII) comparing the first quality score of each translation proposal with a first predetermined acceptance threshold, and wherein based on the comparison, when a first quality score of at least one translation proposal among the first set of translation proposals is greater than the first predetermined acceptance threshold, the method comprises:
  selecting a given translation proposal from amongst the at least one translation proposal; and
  providing the given translation proposal as an accepted translation of the first segment and as at least a part of an accepted translation of the source text.

Indeed the present disclosure enables forming a good quality translations as the first translation memory is configured to provide a first set of translation proposals. Furthermore a selection process to select most suitable translation from the first set of translation proposals is provided. This ensures that best/sufficiently good translation result is achieved. The selection is done by associating each segment of the source text with metadata. Respective metadata info is also associated with the translation proposals. The proposal which has best fit from metadata point of view is automatically selected as an accepted translation of the first segment of the source text. This metadata approach has been found out to provide surprisingly good translations in which the context of the translation is taken in consideration. This way produced translated text is more fluent and problems associated with using direct word to word translations are at least partly eliminated.

DETAILED DESCRIPTION OF DRAWINGS

FIG. 1 illustrates a high-level architecture of a system 100 for translating a source text of a first language to a second language, in accordance with an embodiment of the present disclosure. As shown, the system 100 comprises at least one processor 102 configured to receive a translation request, from a user device 110 communicably coupled to the at least one processor 102 via a data communication network 104, wherein the translation request comprises the source text in the first language. Typically, a user via the user device 110 transmits the translation request over the data communication network 104 to the at least one processor 102 (or the system 100), wherein the translation request comprises the source text of the first language to be translated to the second language. The at least one processor 102 is configured to select, from the source text, at least a first segment. Typically, the source text to be translated is split to distinct text segments (i.e., at least the first segment) to enable the system to translate the source text in a parallel manner and thus enabling parallel processing of each segment to provide faster translations.

Herein, the first segment is associated with at least one first metadata parameter. The at least one processor 102 is configured to associate the at least one first metadata parameter with the first segment. The at least one first metadata parameter can be obtained from the user device 110 as input from a user or it can be obtained from a database of metadata to be associated. Further, the at least one processor 102 is configured to provide the first segment to a first translation memory 106 for determining a first set of translation proposals corresponding to the first segment, wherein the first set of translation proposals are in the second language. Typically, the first segment is provided to the first translation memory 106, wherein each of the first segment is associated with at least one first metadata parameter. Herein, the first translation memory 106 is configured to provide the first set of translation proposals for the first segment, wherein each translation proposal amongst the first set of translation proposals may also be associated with metadata parameters. Further, the at least one processor 102 is configured to obtain the first set of translation proposals from the first translation memory 106, wherein each translation proposal from amongst the first set of translation proposals is associated with at least one second metadata parameter.

Furthermore, the at least one processor 102 is configured to determine a first quality score for each of translation proposal from amongst the first set by comparing the at least one first metadata parameter of the first segment with the at least one metadata parameter of each translation proposal. The first quality score indicates a level of matching (or relevance) of each of the translation proposals to enable a quantitative and/or qualitative analysis of the translation proposals. Furthermore, the at least one processor 102 is configured to compare the first quality score of each translation proposal with a first predetermined acceptance threshold, and wherein based on the comparison, when the first quality score of at least one translation proposal among the first set of translation proposals is greater than the first predetermined acceptance threshold, the at least one processor is 102 configured to select a given translation proposal from amongst the at least one translation proposal and provide the given translation proposal as an accepted translation of the first segment and as at least a part of an accepted translation of the source text to the user device 110. Beneficially, the system 100 and/or the at least one processor 110 enables generation of multiple translation proposals for each of the text segments of the source text and allows selection of an appropriate quality from the provided translation proposals based on requirement.

Further, optionally, when a sufficient quality of the translation proposal available from the first translation memory 106 is not provided, the system 100 may transmit the translation request to the second translation memory 108 to obtain a required translation having a given quality score greater than predetermined acceptance threshold. Further, additionally, the translation proposals provided by the second translation memory 108 are used to update the first translation memory i.e., the accepted translation of the first segment or the source text.

Figure 2:
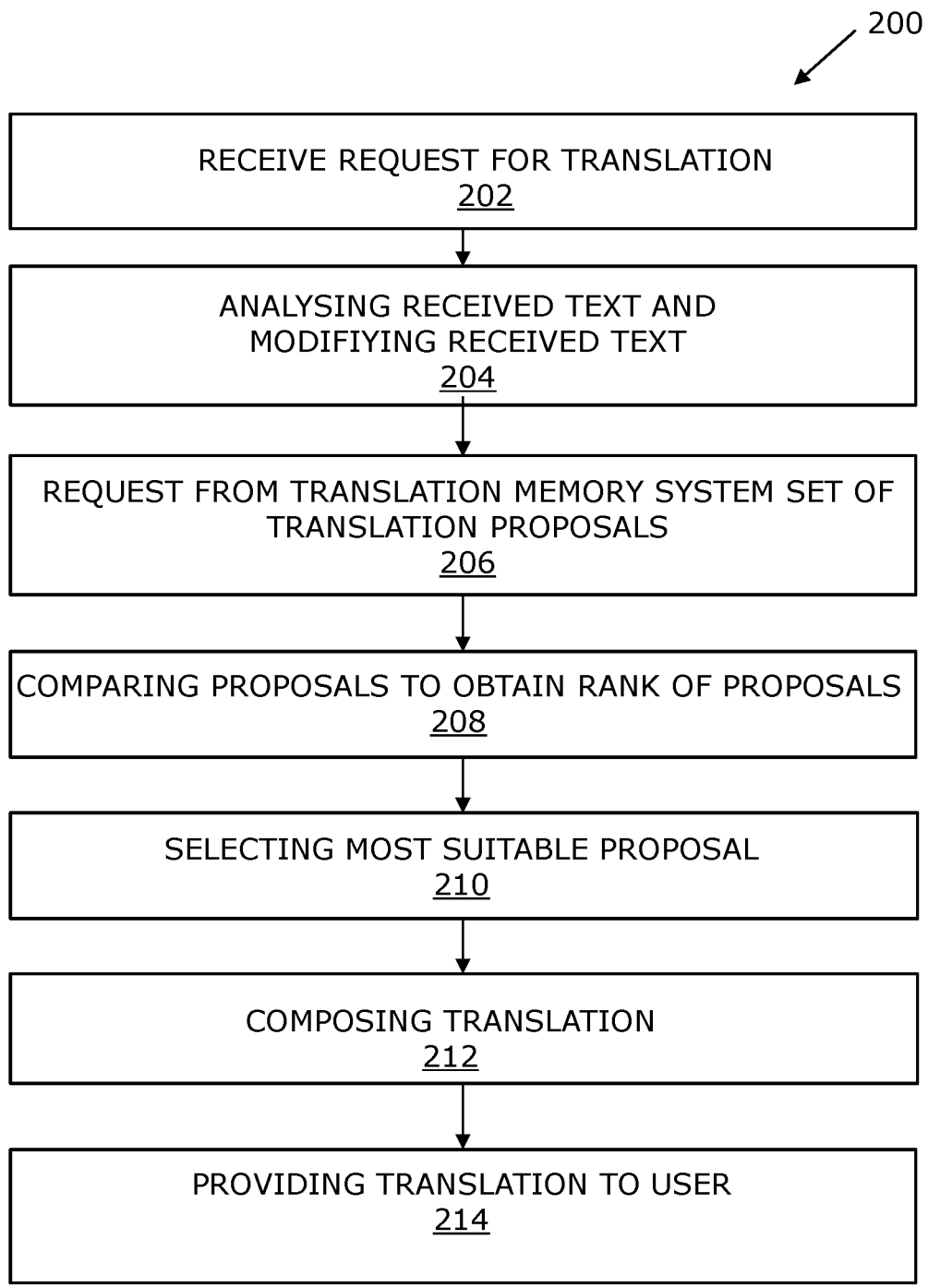
FIG. 2 illustrates a high-level flowchart listing steps involved in an exemplary method for translating a source text of a first language to a second language, in accordance with an embodiment of the present disclosure.

FIG. 2 illustrates a high-level flowchart listing steps involved in an exemplary method 200 for translating a source text of a first language to a second language, in accordance with an embodiment of the present disclosure. As shown, the method 200 comprises steps 202, 204, 206, 208, 210, 212, and 214 performed by the system 100. At step 202, the method 200 comprises receiving a translation request. Herein, a user transmits the translation request comprising the source text to be translated via the method 200. At step 204, the method 200 comprises analysing the received source text and modifying the source text. Herein, analysing the source text comprises removing a second type of text from the source text (or first segment therein) before translation. Further, the method 200 is configured to associate the source text with at least one first metadata parameter to enable the method 200 to qualitatively analyse the received source text to derive inferences therefrom and provide accurate and reliable translations. At step 206, the method 200 comprises requesting, from the first translation memory, a first set of translation proposals. Herein, the translation memory is configured to generate the first set of translation proposals based on the analysed and modified source text (such as, using the given metadata parameter), wherein each translation proposal is associated with at least one second metadata parameter. Further, the method 200 comprises determining a first quality score for each of the translation proposals amongst the first set to enable the method 200 to further compare the translation proposals are derive beneficial inferences therefrom. At step 208, the method 200 comprises comparing each of the first set of translation proposals to obtain a rank for each translation proposal. Herein, based on the comparison of each of the first translation proposal (for example, using the first quality score as a metric), the method 200 comprises obtaining ranks associated with each of the first set of translation proposals. At step 210, the method 200 comprises selecting the most suitable translation amongst the first set of translation proposals based on the obtained ranks. Typically, at least one translation proposal is selected from amongst the first set based on the obtained ranks, wherein the at least one translation proposal comprises a quality score higher than first predetermined acceptance threshold. At step 212, the method 200 comprises composing a given translation proposal from the received at least one translation proposal, wherein the given translation proposal is in the second language. Herein, the given translation proposal is selected from the at least one translation proposal based on at least the first or second metadata parameters, the user preferences, the first quality scores or the obtained ranks. And, at step 214, the method 200 comprises providing the given translation as an accepted translation of the first segment and at least as a part of the accepted translation of the source text.

Figure 3A:
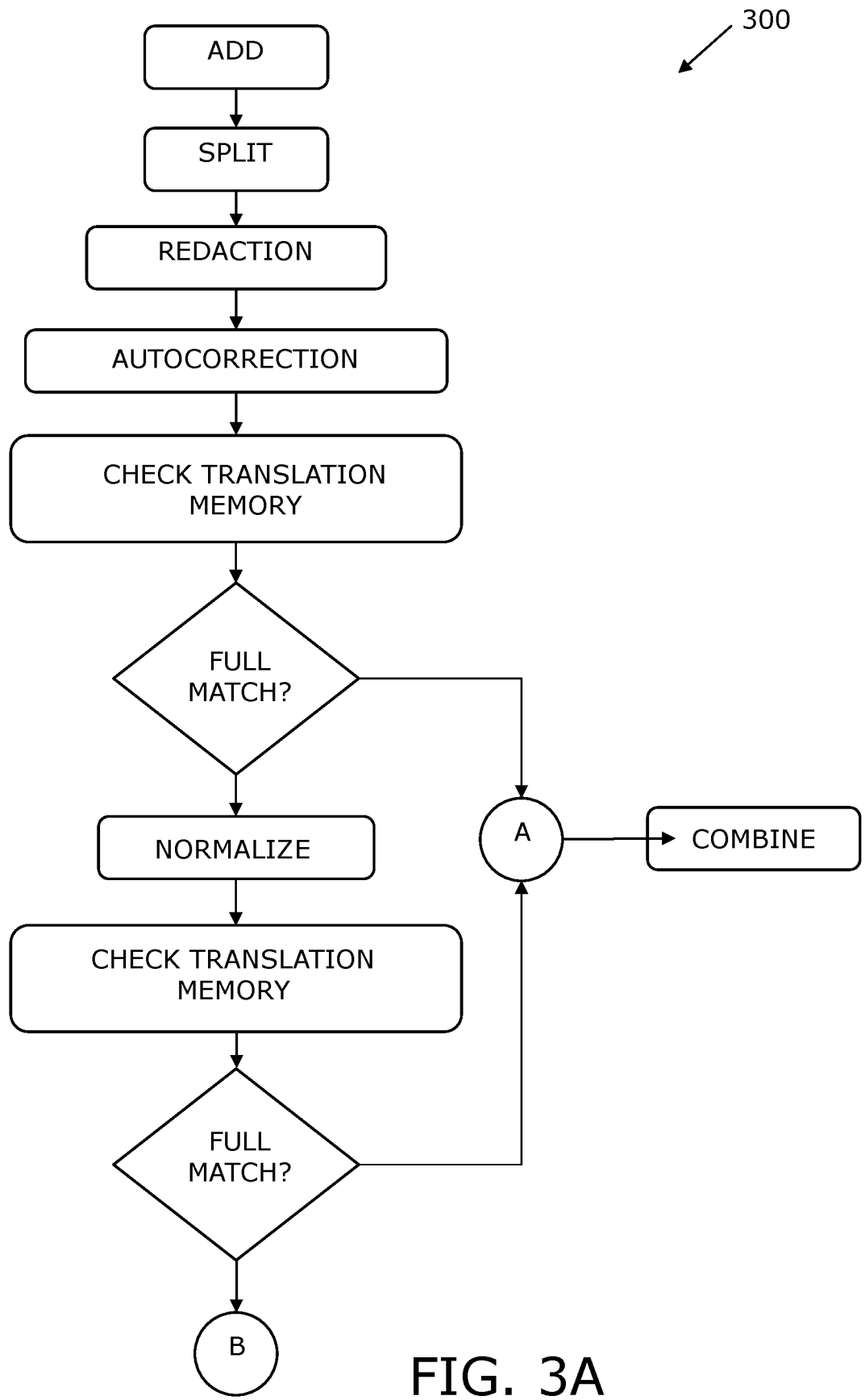
FIGS. 3A and 3B illustrate a detailed flowchart listing steps involved in another exemplary method for translating a source text of a first language to a second language, in accordance with various embodiments of the present disclosure.
Figure 3B:
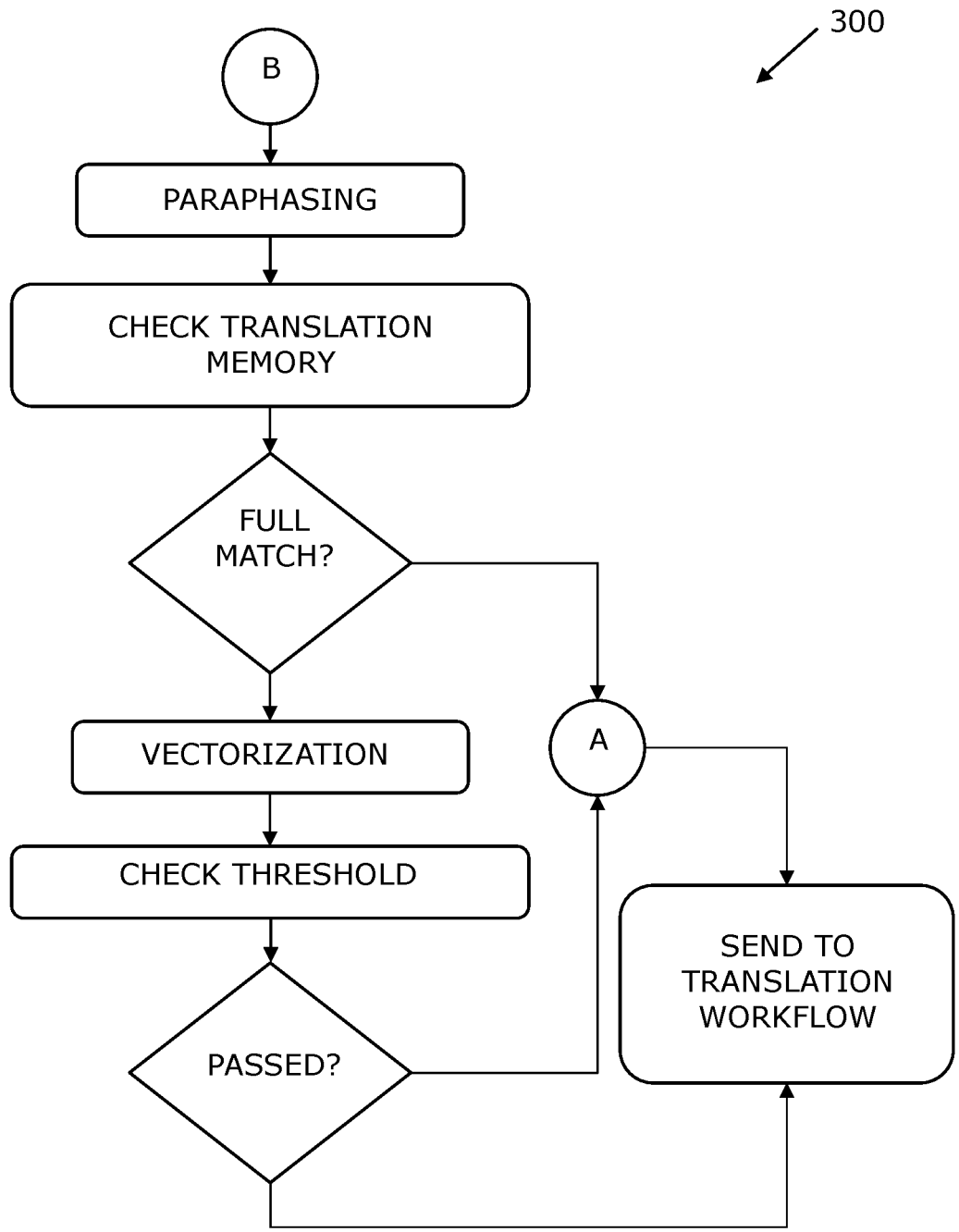

FIGS. 3A and 3B illustrate a detailed flowchart listing steps involved in another exemplary method 300 for translating a source text of a first language to a second language, in accordance with various embodiments of the present disclosure. It will be appreciated that the flowchart for the method 300 is depicted as two separate flowcharts for the purpose of clarity and conciseness. As shown, the method 300 comprises various process steps to be followed to provide a complete translation of the source text.

Referring to FIG. 3A, the method 300 comprises, at a first step, adding the source text for translation to a translation memory. At a second step, the method 300 comprises splitting the source text to form at least a first segment. Further, at a third step, the method 300 comprises redacting personal and/or confidential information from the first segment. Furthermore, at a fourth step, the method 300 comprises autocorrecting the first segment (or the source text) to correct any misspelled words in the first segment. Upon performing autocorrection on the first segment, at a fifth step, the method 300 comprises checking a first translation memory for a full matching to obtain a first set of translation proposals therefrom. The term "matching" refers to an edit distance matching algorithm (such as, the Levenshtein distance), wherein full match indicates an exact match and has the edit distance of zero, whereas the edit distance greater than or lesser than zero indicates a partial match at most. Herein, upon checking the translation memory, if a full match is obtained, at least one of the first set of translation proposals is provided to translational workflow and if a full match of the translation proposal is not obtained, at a sixth step, the method 300 comprises normalizing the first set of translation proposals to obtain versions of the first set of translation proposals. Hereinafter, the method 300 comprises checking the translation memory again for a full match, if a full match is obtained, at least one of the first set of translation proposals is provided to the translational workflow and if a full match of the translation proposal is not obtained, further processing of the first set of translation proposals is implemented.

Referring to FIG. 3B, the method 300 comprises, at a seventh step, paraphrasing each of the first set of translation proposals to derive better translations or matches therefrom. Hereinafter, the method 300 comprises checking the translation memory again for a full match, if a full match is obtained, at least one of the first set of translation proposals is provided to the translational workflow and if a full match of the translation proposal is not obtained, at an eighth step, the method 300 comprises vectorizing the first set of translation proposals to enable translation of the source text of the first language to the second language. Thereinafter, the method 300 comprises checking the translation memory again for a full match, if a full match is obtained, at least one of the first set of translation proposals is provided to the translational workflow and if a full match of the translation proposal is not obtained, at a ninth step, the method 300 comprises checking the quality score for each of the first set of translation proposals against a predetermined acceptance threshold, wherein at least one translation proposal exceeding the predetermined acceptance threshold is further provided to the translational workflow.

Optionally, based on the method 300, a given translation memory is provided different versions of the first segment and/or the translation proposals such as, after autocorrection, after normalization, after paraphrasing to obtain a plurality of versions of the first segment and/or the first set of translation proposals. Additionally, optionally, the text is enriched before being implemented to the translation memory to obtain a more reliable and accurate translation.

Figure 4:
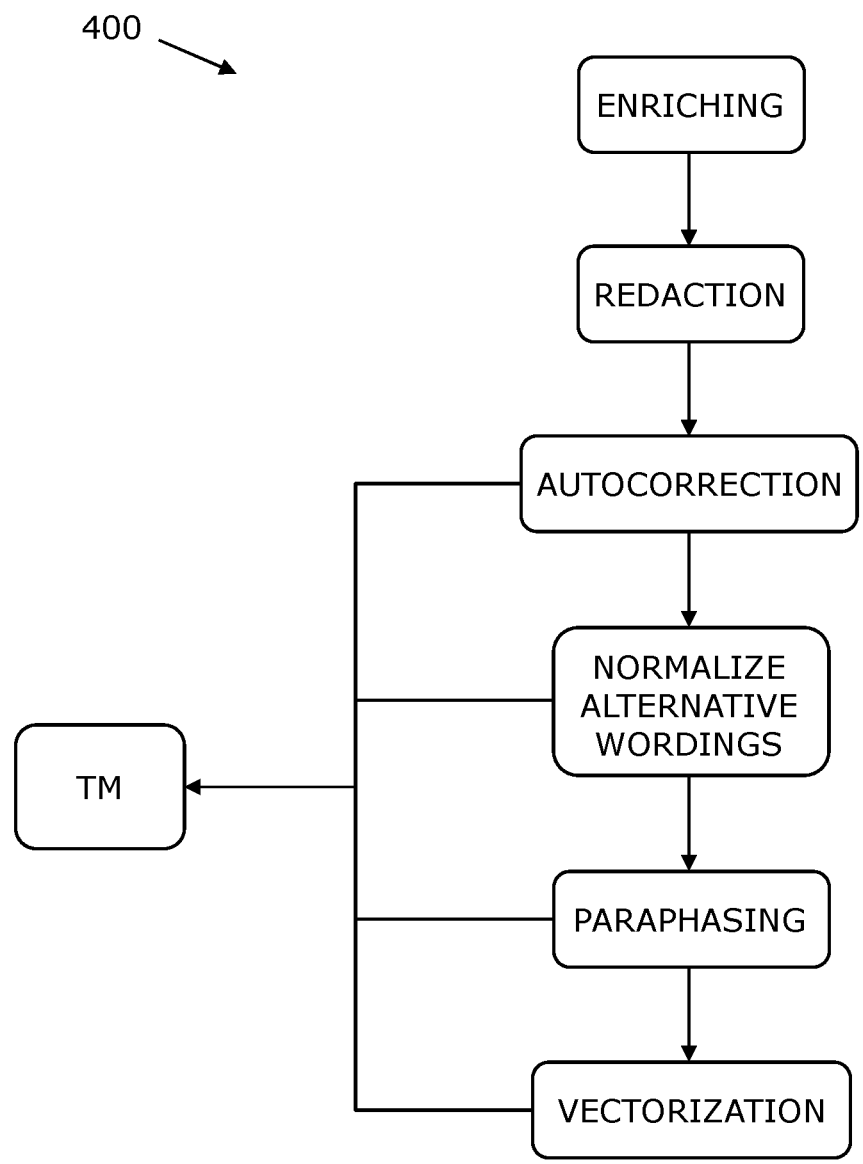
FIG. 4 illustrates a detailed flowchart listing steps involved in pre-processing in an exemplary method for translating a source text of a first language to a second language, in accordance with an embodiment of the present disclosure.

FIG. 4 illustrates a detailed flowchart listing steps involved in pre-processing in an exemplary method 400 for translating a source text of a first language to a second language, in accordance with an embodiment of the present disclosure. As shown, the method 400 depicts the steps of pre-processing performed on a given segment for deriving beneficial inferences therefrom to improve the accuracy and computation time of the method 400. Further, as shown, the method 400 comprises six distinct steps to be implemented on the given segment prior to being provided to the first translation memory. Typically, the six distinct steps include enriching the given segment, redacting the given segment, auto-correcting the given segment, normalizing the given segment, paraphrasing the given segment, and vectorizing the given segment to beneficially obtain a plurality of versions of the given segment and enabling the method 400 to perform an exhaustive translation of the given segment having a reliable and accurate translation.

Figure 5:
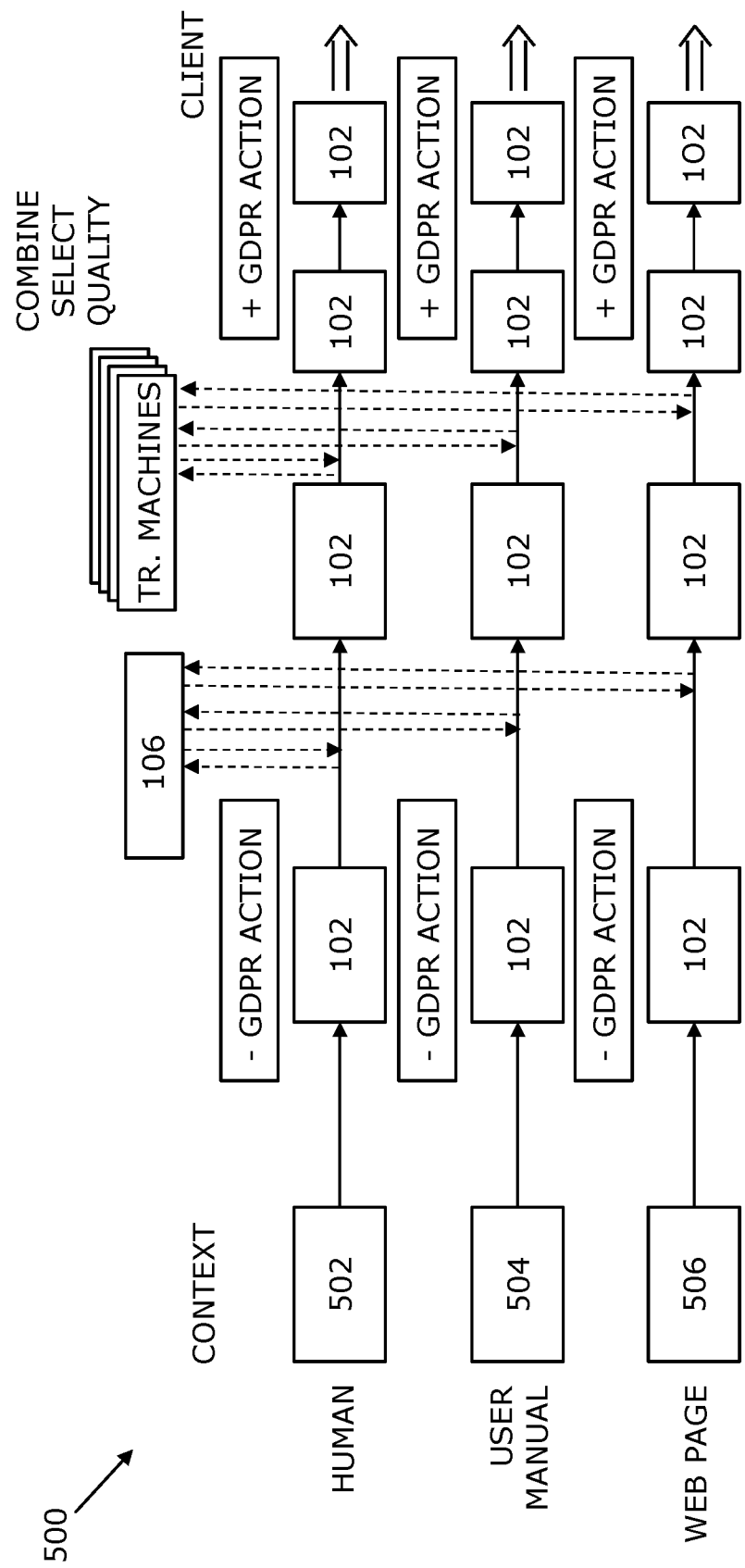
FIG. 5 illustrates a detailed flowchart listing steps involved in an exemplary process flow of a method performed by the system, in accordance with an embodiment of the present disclosure.

FIG. 5 illustrates a detailed flowchart listing steps involved in an exemplary process flow of a method 500 performed by the system 100, in accordance with an embodiment of the present disclosure. As shown, three different type of source texts are received by the at least one processor 102 from the user device 110, namely, a first source text 502 indicating a human written text, a second source text 504 indicating user manual text, and a third source text 506 indicating web page text. Herein, the at least one processor 102 is configured to remove a second type of text (depicted as −GDPR action) from the provided source texts 502, 504, 506 based on GDPR actions. Herein, based on the privacy rules and regulations (GDPR), the personal and/or confidential information is redacted from the provided source texts 502, 504, 506, to beneficially ensure a secure and privacy aware translation of the source text and compliance with privacy and security regulations. In an example, based on the GDPR metadata parameter, the relevant text (to the GDPR) is removed from the translation, or the related text is only provided to a given translation memory 106 or 108 (not shown) and not shared with other entities. Beneficially, the GDPR metadata parameter provides translations that is limited based on user profiles and thus enables the method 500 to provide privacy aware management and allows selectively sharing the private or confidential translations i.e., the private translations are not provided directly to a user, prior to removing the GDPR related data. Moreover, the GDPR metadata enables the method 500 to state ownership or relationship of the first segment or the source text, to a first party only. In said case, the translations generated for the provided source text 502, 504, 506 is not shared with other entities except for the first translation memory 106. Moreover, upon performing various steps of the method 500 (or of the method 200, 300 or 400), such as pre-processing, processing, modifying and so forth on the source text to obtain the first set of translation proposals. Furthermore, upon performing the steps of the method 500 (or of the method 200, 300 or 400), the method comprises adding the second type of text (depicted as +GDPR action) to the proposed translation before providing the translation to the user or user device 110.

Figure 6:
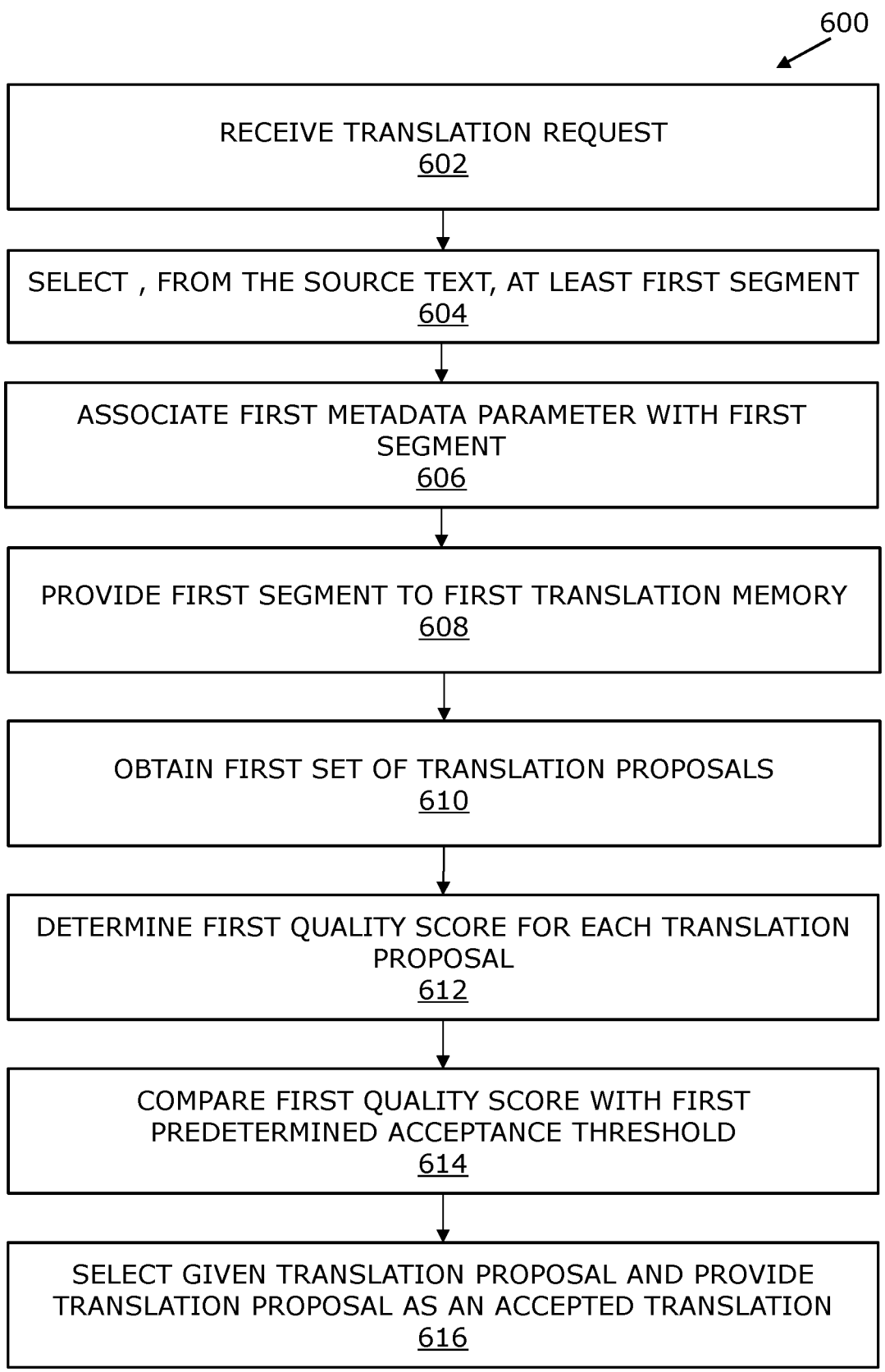
FIG. 6 illustrates a high-level flowchart listing steps involved in a method for translating a source text of a first language to a second language, in accordance with another embodiment of the present disclosure.

FIG. 6 illustrates a high-level flowchart listing steps involved in a method 600 for translating a source text of a first language to a second language, in accordance with another embodiment of the present disclosure. As shown, the method 600 comprises steps 602, 604, 606, 608, 610, 612, and 614. At step 602, the method 600 comprises receiving a translation request wherein the translation request comprises the source text in the first language. Herein, a user transmits, via a user device, the translation request comprising the source text in the first language to be translated to the second language. At step 604, the method 600 comprises selecting, from the source text, at least a first segment. Herein, the source text received from the user device comprises multiple text segments, wherein at least one of the multiple text segments are selected as the first segment. At step 606, the method 600 comprises associating at least one first metadata parameter with the first segment. Herein, the method 600 is configured to associate the first text with the at least one first metadata parameter to enable the method 600 to qualitatively analyse the first segment (or the source text) to derive inferences therefrom and provide accurate and reliable translations. At step 608, the method 600 comprises obtaining the first set of translation proposals from the first translation memory, wherein each translation proposal from amongst the first set is associated with at least one second metadata parameter. Herein, the method 600 comprises obtaining the first set of translation proposals from the first translation memory, wherein the first set of translation proposals are in the second language. At step 610, the method 600 comprises comparing the at least one first metadata parameter of the first segment with the at least one second metadata parameter of each translation proposal for determining a first quality score for each translation proposal from amongst the first set by comparing the at least one first metadata parameter of the first segment with the at least one second metadata parameter of each translation proposal. At step 612, the method 600 comprises comparing the first quality score of each translation proposal with a first predetermined acceptance threshold. Herein, comparison of the first quality score is done with the first predetermined acceptance threshold to ensure the quality and relevance of the translations provided by the present method 600. And at step 614, wherein based on the comparison at step 612, when a first quality score of at least one translation proposal among the first set of translation proposals is greater than the first predetermined acceptance threshold, the method 600 comprises selecting a given translation proposal from amongst the at least one translation proposal and providing the given translation proposal as an accepted translation of the first segment and as at least a part of an accepted translation of the source text. Herein, the method 600 comprises selecting the given translation proposal having the highest quality score or rank from amongst the at least one translation proposal and thereafter providing the given translation as an accepted translation of the first segment and at least as a part of the accepted translation of the source text.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Expressions such as "may" and "can" are used to indicate optional features, unless indicated otherwise in the foregoing. Reference to the singular is also to be construed to relate to the plural.

The invention claimed is:

1. A method for translating a source text of a first language to a second language, the method comprising:
 (i) receiving a translation request, wherein the translation request comprises the source text in the first language;
 (ii) selecting, from the source text, at least a first segment;
 (iii) associating at least one first metadata parameter with the first segment, the at least one first metadata parameter comprising a parameter of the first segment itself, including a sentiment of the first segment;
 (iv) providing the first segment to a first translation memory for determining a first set of translation proposals corresponding to the first segment, wherein the first set of translation proposals are in the second language;
 (v) obtaining the first set of translation proposals from the first translation memory, wherein each translation proposal from amongst the first set is associated with at least one second metadata parameter of each translation proposal itself, including a sentiment of each translation proposal;
 (vi) determining a first quality score for each translation proposal from amongst the first set by counting a number of first metadata parameters of the first segment that match second metadata parameters of each translation proposal and applying a weight to each match; and
 (vii) comparing the first quality score of each translation proposal with a first predetermined numerical acceptance threshold, and wherein based on the comparison, when a first quality score of at least one translation proposal among the first set of translation proposals is greater than the first predetermined acceptance threshold, the method comprises:
  selecting a given translation proposal from amongst the at least one translation proposal; and
  providing the given translation proposal as an accepted translation of the first segment and as at least a part of an accepted translation of the source text.

2. The method according to claim 1, wherein the at least one translation proposal comprises a plurality of translation proposals, the plurality of translation proposals having a plurality of first quality scores, and wherein a first quality score of the given translation proposal is a highest first quality score from amongst the plurality of first quality scores.

3. The method according to claim 1, wherein when the first quality score of each translation proposal is lesser than the first predetermined acceptance threshold, the method comprises:
 (A) providing the first segment to a second translation memory for determining a second set of translation proposals corresponding to the first segment, wherein the second set of translation proposals are in the second language;
 (B) obtaining the second set of translation proposals from the second translation memory, wherein each translation proposals from amongst the second set of translation proposals is associated with at least one second metadata parameter;
 (C) determining a second quality score for each translation proposal from amongst the second set of translation proposals by comparing the at least one first metadata parameter of the first segment with the at least one second metadata parameter of each translation proposal; and (D) comparing the second quality score for each translation proposal with a second predetermined acceptance threshold, and wherein based on the comparison, when a second quality score of at least one translation proposal among the second set of translation proposals is greater than the second predetermined acceptance threshold, the method comprises:
selecting a given translation proposal from amongst the at least one translation proposal; and
providing the given translation proposal as an accepted translation of the first segment and as at least part of an accepted translation of the source text.

4. The method according to claim 3, further comprising:
selecting, from the source text, a second segment; and
performing steps (iii) to (vii) and/or steps (A) to (D) for the second segment to update the translation of the source text.

5. The method according to claim 3, further comprising:
processing a given segment for generating at least one version of the given segment; and
performing at least one of:
steps (iv) to (vi);
steps (A) to (C), on the at least one version.

6. The method according to claim 5, wherein the step of processing the given segment comprises at least one of: changing a word order in the given segment, omitting at least one word in the given segment, adding at least one word in the given segment, paraphrasing the given segment, correcting at least one spelling error in the given segment, generating an alternative expression for the given segment, vectorizing the given segment.

7. The method according to claim 1, further comprising:
pre-processing a given segment, prior to providing the given segment to a given translation memory, for determining a first type of text and a second type of text in the given segment;
removing the second type of text from the given segment to include only the first type of text in the given segment.

8. The method according to claim 7, further comprising modifying an accepted translation of the given segment to include the second type of text.

9. The method according to claim 7, wherein the second type of text does not require translation and comprises at least one of: a proper noun, an identification information, a symbol, a numeral, a web link, a punctuation.

10. The method according to claim 7, wherein the step of pre-processing the given segment comprises at least one of: implementing natural language processing to determine language components in the given segment, classifying the language components in the given segment, semantically evaluating words in the given segment.

11. The method according to claim 1, wherein when a given quality score of each translation proposal of a given set of translation proposals corresponding to a given segment is lesser than a given predetermined acceptance threshold, the method further comprises:
transmitting an external translation request to an external source, wherein the external translation request comprises at least the given segment; and
receiving, from the external source, an external translation of the given segment.

12. The method according to claim 11, further comprising removing a second type of text from the external translation request.

13. The method according to claim 1, wherein the source text comprises a plurality of segments, each segment is associated with one or more translation proposals, the one or more translation proposals having one or more quality scores associated therewith, and wherein the method further comprises:
generating a plurality of translation permutations, wherein each translation permutation comprises a single translation proposal for each segment;
determining a cumulative quality score for each translation permutation; and
selecting, as the accepted translation of the source text, a given translation permutation having a highest cumulative quality score.

14. A computer program product comprising a non-transitory computer-readable storage medium having computer-readable instructions stored thereon, the computer-readable instructions being executable by a computerized device comprising processing hardware to execute a method as claimed in claim 1.

15. A system for translating a source text of a first language to a second language, the system comprising at least one processor configured to:
(i) receive a translation request, from a user device communicably coupled to the at least one processor via a data communication network, wherein the translation request comprises the source text in the first language;
(ii) select, from the source text, at least a first segment;
(iii) associate at least one first metadata parameter with the first segment, the at least one first metadata parameter comprising a parameter of the first segment itself, including a sentiment of the first segment;
(iv) provide the first segment to a first translation memory for determining a first set of translation proposals corresponding to the first segment, wherein the first set of translation proposals are in the second language;
(v) obtain the first set of translation proposals from the first translation memory, wherein each translation proposal from amongst the first set of translation proposals is associated with at least one second metadata parameter of each translation proposal itself, including a sentiment of each translation proposal;
(vi) determine a first quality score for each of translation proposal from amongst the first set by counting a number of first metadata parameters of the first segment that match second metadata parameters of each translation proposal and applying a weight to each match; and
(vii) compare the first quality score of each translation proposal with a first predetermined numerical acceptance threshold, and wherein based on the comparison, when the first quality score of at least one translation proposal among the first set of translation proposals is greater than the first predetermined acceptance threshold, the at least one processor is configured to:
select a given translation proposal from amongst the at least one translation proposal; and
provide the given translation proposal as an accepted translation of the first segment and as at least a part of an accepted translation of the source text to the user device.

16. A method for translating a source text of a first language to a second language, the method comprising:
(I) receiving a translation request, wherein the translation request comprises the source text in the first language;
(II) selecting, from the source text, at least a first segment;
(III) associating at least one first metadata parameter with the first segment, the at least one first metadata parameter comprising a parameter of the first segment itself, including a sentiment of the first segment;

(III.1) generating a set of versions of the first segment and associating the said at least one first metadata parameters with each of the versions of the set of versions;

(IV) providing each of the generated set of versions a first translation memory for determining a first set of translation proposals corresponding to the set of versions, wherein the first set of translation proposals are in the second language;

(V) obtaining the first set of translation proposals from the first translation memory, wherein each translation proposal from amongst the first set is associated with at least one second metadata parameter comprising a parameter of each translation proposal itself, including a sentiment of each translation proposal;

(VI) determining a first quality score for each translation proposal from amongst the first set by counting a number of first metadata parameters that match second metadata parameters of each translation proposal and applying a weight to each match; and (VII) comparing the first quality score of each translation proposal with a first predetermined numerical acceptance threshold, and wherein based on the comparison, when a first quality score of at least one translation proposal among the first set of translation proposals is greater than the first predetermined acceptance threshold, the method comprises:

selecting a given translation proposal from amongst the at least one translation proposal; and providing the given translation proposal as an accepted translation of the first segment and as at least a part of an accepted translation of the source text.

* * * * *